US006568589B1

(12) United States Patent
Bonamy

(10) Patent No.: US 6,568,589 B1

(45) Date of Patent: May 27, 2003

(54) COIN-EMPTYING DEVICE FOR A COLUMN-SHAPED SLOT MACHINE

(75) Inventor: Rodolphe Bonamy, Chatillon le Duc (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/504,774

(22) Filed: Feb. 14, 2000

Related U.S. Application Data

(63) Continuation-in-part of application No. PCT/FR98/01810, filed on Aug. 14, 1998.

(30) Foreign Application Priority Data

Aug. 19, 1997 (FR) ............................................ 97 10447

(51) Int. Cl.[7] ................................................ B65G 11/04

(52) U.S. Cl. ............................ 232/44; 194/350; 232/55

(58) Field of Search ........................ 232/44, 43.1, 43.2, 232/15, 16, 55; 194/344, 350; 193/DIG. 1

(56) References Cited

U.S. PATENT DOCUMENTS 2,277,916 A 3/1942 Klemt
2,869,777 A 1/1959 Share
3,653,586 A * 4/1972 Bonneson .................. 232/43.2
3,938,733 A 2/1976 Weber
4,484,592 A * 11/1984 Burnside ..................... 453/57
4,545,475 A * 10/1985 Fillod et al. ................ 194/350
4,881,632 A * 11/1989 LiCausi ...................... 194/350
5,009,365 A * 4/1991 Holtzer ........................ 232/16
5,044,483 A 9/1991 Stefan
5,129,501 A * 7/1992 Halsey et al. ............... 194/350
5,386,903 A * 2/1995 Rothschild et al. ......... 194/350
5,579,888 A * 12/1996 Slyper ........................ 194/350
5,715,927 A * 2/1998 Brandt ....................... 194/344
6,066,038 A * 5/2000 Sciortino et al. ............. 453/17

FOREIGN PATENT DOCUMENTS

EP 0 044 754 1/1982
EP 0 391 302 10/1990

* cited by examiner

*Primary Examiner*—William Miller
(74) *Attorney, Agent, or Firm*—Cohen, Pontani, Liberman & Pavane

(57) ABSTRACT

A coin-emptying device for a column-shaped slot machine. A hopper (10) is provided for storing coins and having an outlet opening (11). A coin-discharge drawer (20) is movable between a "closed" first position in which the drawer closes the outlet opening (11) of the hopper (10), and an "open" second position in which the outlet opening (11) of the hopper is cleared so as to enable coins to be transferred from the machine to the outside.

7 Claims, 4 Drawing Sheets

COIN-EMPTYING DEVICE FOR A COLUMN-SHAPED SLOT MACHINE

This application is a CIP of PCT/FR98/01810, filed Aug. 14, 1998.

FIELD OF THE INVENTION

The present invention relates to a coin-emptying device for a column-shaped slot machine. A particularly advantageous application of the invention lies in the field of securing the storage of coins in and the emptying of coins from a slot machine for issuing pay-and-display tickets for parking.

BACKGROUND OF THE INVENTION

U.S. patent application Ser. No. 09/486,026, the content of which is hereby incorporated by reference, describes a coin-operated pay-and-display slot machine having the structure of a staged column. A particularly important element of that machine is its emptying device, commonly referred to as a "money box", which is the location where all the money contained in the machine is stored temporarily and which needs to be emptied regularly during emptying rounds performed by authorized agents. That highly sensitive area requires a high degree of protection to keep the money secure, both while the coins are being stored and while they are being discharged.

In general, there are two large categories of emptying device: moving money box devices, and transfer-cannister devices.

A moving money box is a box into which the coins drop. When the box is full, the authorized emptying agent extracts the box from the machine and replaces it with an empty box.

In contrast, a machine using a transfer cannister device receives coins in a defined zone, generally a funnel-shaped space known as a "hopper", which is open at the bottom so as to allow coins to be discharged when the machine is being emptied. When the hopper is full, the emptying agent attaches an empty collection receptacle, i.e. the "transfer cannister", on or under the machine, and by opening a flap transfers the coins from the machine to the transfer cannister. Generally, the flap is situated at the bottom of the hopper so that transfer is performed under gravity. Nevertheless, this emptying function could equally well be devised on the same general principles using a force other than gravity, e.g. due to suction. Once transfer has been completed, the emptying agent closes the flap and removes the full cannister from the machine. It can then be emptied at a central depot.

Both types of emptying device are well suited to slot machines having a money box incorporated in a housing that projects outwardly from a stand, with the moving money box being changed or the transfer of coins to the cannister taking place via the bottom of the housing.

However, when the machine is column-shaped, and when the money is to be transferred by gravity, it is difficult or even impossible to place the transfer cannister under the hopper.

SUMMARY OF THE INVENTION

An object of the present invention is to provide a coin-emptying device for a column-shaped slot machine which enables coins to be emptied by being discharged from the machine, optionally by means of a transfer cannister.

This and other objects are accomplished in accordance with one aspect of the present invention directed to a coin emptying device that comprises a hopper for storing the coins having an outlet opening. A coin-discharge means is movable between a "closed" first position in which the discharge means closes the outlet opening of the hopper, and an "open" second position in which the outlet opening of the hopper is cleared so as to enable coins to be transferred from the machine to the outside.

Thus, in the closed position, the two component elements of the device of the invention, namely the hopper and the moving discharge means are, as it were, retracted into the column structure of the machine, whereas in the open position they are deployed with the coin-emptying outlet being offset to the outside of the actual structure of the machine.

As explained in detail below, an advantage of the device of the invention is that the outlet opening of the hopper can be placed in the center of the machine thus making fraudulent access thereto almost impossible.

In a particular embodiment of the invention, the discharge means includes a drawer placed beneath the hopper and having a sloping duct with an inlet orifice and an outlet orifice, such that in the open position of the drawer the inlet orifice is in communication with the outlet opening of the hopper, with the discharge orifice enabling coins to be transferred from the machine to the outside.

Coins can be collected outside the machine by any means. Nevertheless, the invention provides for the device of the invention also to include a "transfer-cannister" receptacle into which the coins are emptied, the transfer cannister having a moving opening flap designed to put itself into communication with the discharge means when in the open position.

More precisely, when the discharge means comprises a moving drawer, the invention provides that when the drawer is in the closed position, the opening flap of the transfer cannister is fixed to the drawer, and the flap is used to bring the moving drawer into its open position while simultaneously putting the transfer cannister into communication with the discharge orifice of the sloping duct.

In accordance with another feature of the invention, the hopper includes a coin unclogging system. It has been found that when the outlet of the hopper is clear, no coins drop out, regardless of the shape and dimensions of the opening, with this being because the coins form domes inside the hopper, which domes must continuously be broken since as soon as one dome has been broken, another reforms immediately afterwards.

Another advantageous characteristic of the device of the invention is that it is placed inside double-walled armoring, the coins being stored in an internal structure to withstand vandalism, itself being enclosed in an external structure, e.g. made of steel, that provides protection. The gap between the two walls makes it possible, where necessary, to receive additional plates of armoring.

The device of the invention can also have a locking system for locking the moving means for discharging coins, which system is placed in the center of the double-walled armoring, thus making access to the locking system very difficult from the outside.

DETAILED DESCRIPTION OF THE PREFERRED EMBODIMENT

Figure 1:
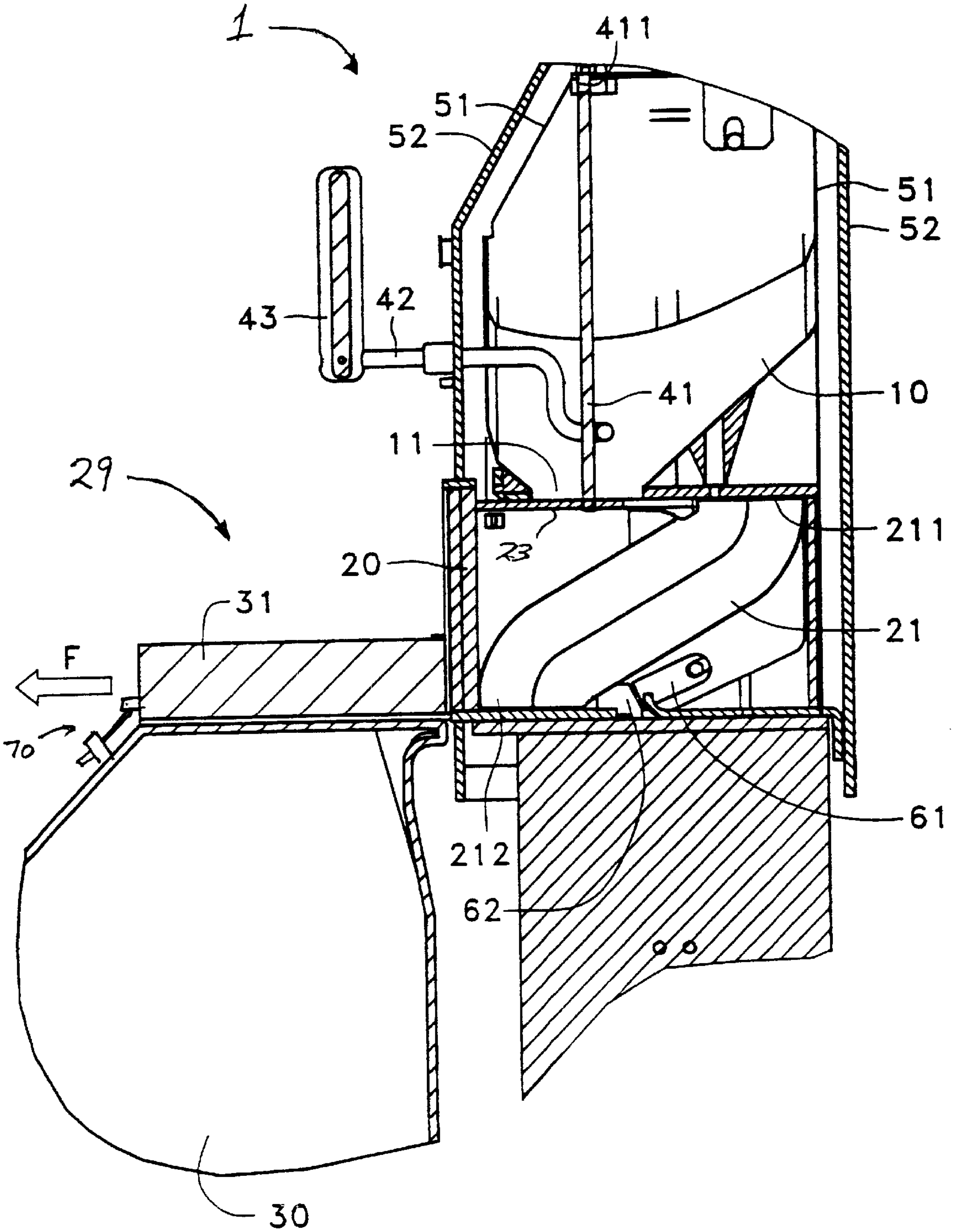
FIG. 1 is a side view in section of a coin-emptying device of the invention, with the drawer in the closed position.
Figure 2:
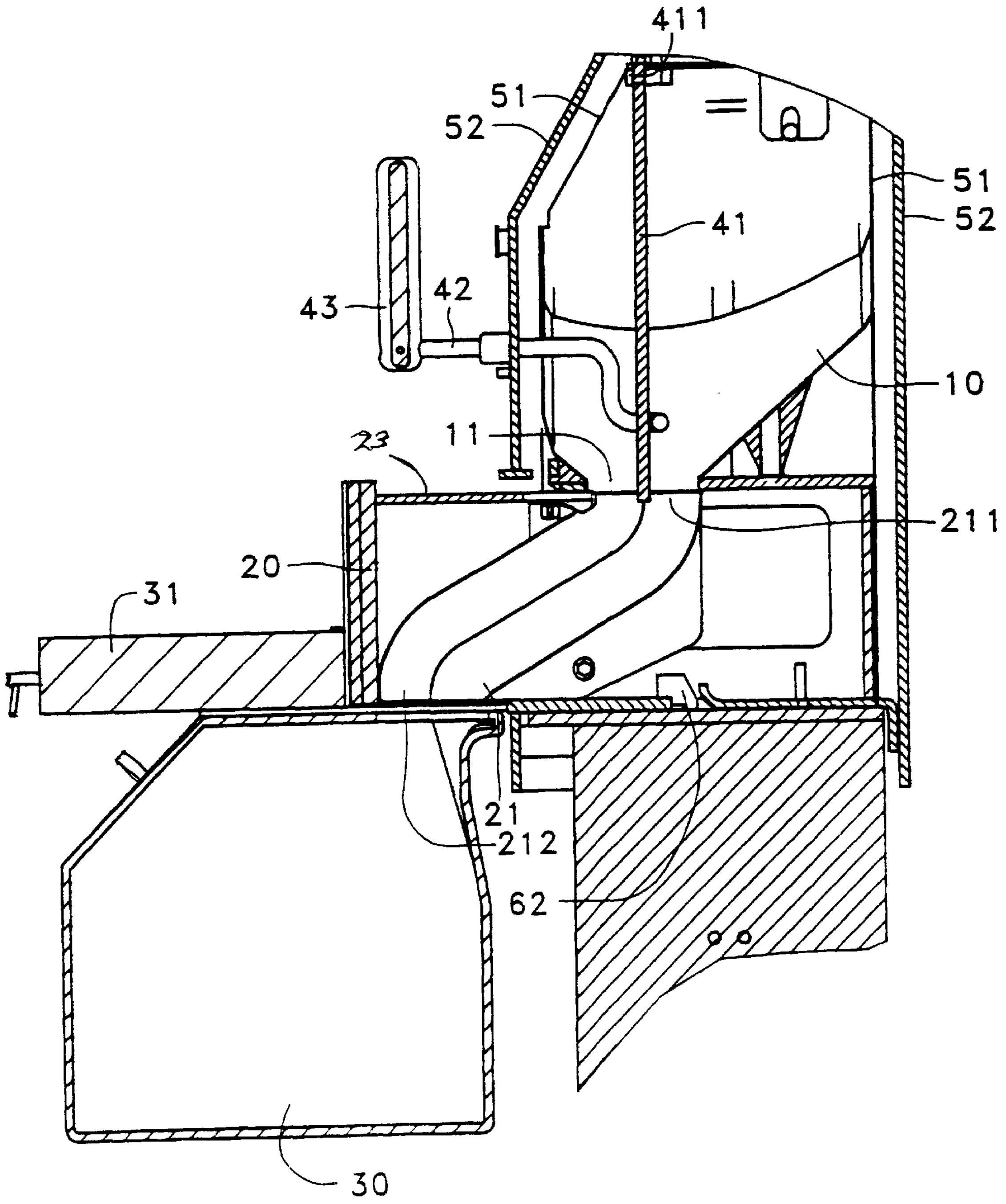
FIG. 2 is a side view in section of the FIG. 1 coin-emptying device with the drawer in the open position.

The coin-emptying device 1 shown in FIGS. 1 and 2 is designed to be fitted to a column-shaped slot machine (not shown) for dispensing "pay-and-display" tickets for parking and of the type described in the above-specified French patent application. The coin-emptying device 1 is intended to transfer coins, e.g. into a receptacle such as a transfer cannister.

To this end, the coin-emptying device 1 comprises a hopper 10 for storing coins that come from a coin-selector and a pre-cashing stage (not shown). At the bottom, the hopper 10 has an outlet opening 11 through which the coins must pass during emptying.

As shown in FIGS. 1 and 2, the coin-emptying device of the invention also has coin-discharge means 20 which, in the embodiment shown, is a drawer disposed beneath the storage hopper 10 and including a sloping duct 21 having an inlet orifice 211 and a discharge orifice 212.

The drawer 20 can be moved between two extreme positions. In a "closed" first position, shown in FIG. 1, upper wall 23 of the drawer 20 closes the outlet opening 11 of the hopper 10. This is the normal, coin collection position of the coin-emptying device in which coins pile up in the storage hopper 10 waiting for the next emptying. It can be seen that in this position, the drawer 20 is retracted under the hopper 10 in a manner that is entirely compatible with the column structure of the machine. In the "open" second position of drawer 20, shown in FIG. 2, wall 23 is removed from the outlet opening 11 of the hopper 10 so that hopper 10 is put into communication with the inlet orifice 211 of the sloping duct 21. The outlet orifice 212 of duct 21 enables coins to be transferred out from the machine, as explained below. This is the emptying position of the device in which coins flow under the influence of gravity from the hopper 10 to the outside via the sloping duct 21 whose function is thus to offset the outlet of the hopper 10 to the outside of the machine. Naturally, while emptying is taking place, the drawer 20 projects out from the column structure. Nevertheless, this position is only temporary.

The coins thus flowing out from the machine can be emptied into assembly 29. As shown in FIGS. 1 and 2, the assembly 29 includes a transfer cannister 30 on which opening flap 31 is mounted to be slidably movable relative thereto. Assembly 29 is normally detached from device 1 and, in fact, it is brought to device 1 by the emptying agent. When device 1 is to be emptied of coins, the person acting as the emptying agent mounts assembly 29 on device 1. Any one of several structural arrangements can be used to effect such a temporary mount. This would be readily apparent to anyone with ordinary skill in the art and, thus, details thereof are deemed unnecessary in the interests of being succinct and to avoid unduly burdening this text.

The assembly 29 is mounted so as to enable putting the transfer cannister 30 into communication with the drawer 20 in its open position. More precisely, it can be seen in FIG. 1 that when the drawer 20 is in its closed position, the opening flap 31 is placed adjacent thereto by virtue of its position on assembly 29. To empty out the money, the flap 31 is fixed to the drawer 20 (as explained below) and then the drawer 20 is manually moved in translation in the direction of arrow F in FIG. 1 to its open position, simultaneously uncovering opening 11 and thus putting the transfer cannister 30 into communication with the discharge orifice 212. Coins can then flow directly under the influence of gravity from the storage hopper 10 into the transfer cannister 30.

When the money has been emptied out, the opening flap 31 is manually pushed in a direction opposite to force F, thereby returning the drawer 20 to its closed position and simultaneously closing the transfer cannister 30 again. Flap 31 is fixed to drawer 20 by any one of several arrangements that will readily occur to anyone with ordinary skill in the art. For example, flap 31 is provided with a key (not shown) slidably secured thereon. Such key fits within a corresponding opening (not shown) in drawer 20. The key is slid into drawer 20 and manipulated, such as by rotation around its longitudinal axis, to engage drawer 20.

It will be observed that at no time is the inside of the transfer cannister made accessible. While assembly 29 is being transported, flap 31 is normally locked into the position shown in FIG. 1 by padlock arrangement 70. After the assembly 29 is secured to device 1, the emptying agent removes the padlock so that flap 31 is free to be slidably moved to open the drawer, as explained above. Of course, when drawer 20 is open, its bottom covers the opening in transfer cannister 30.

Figure 3:
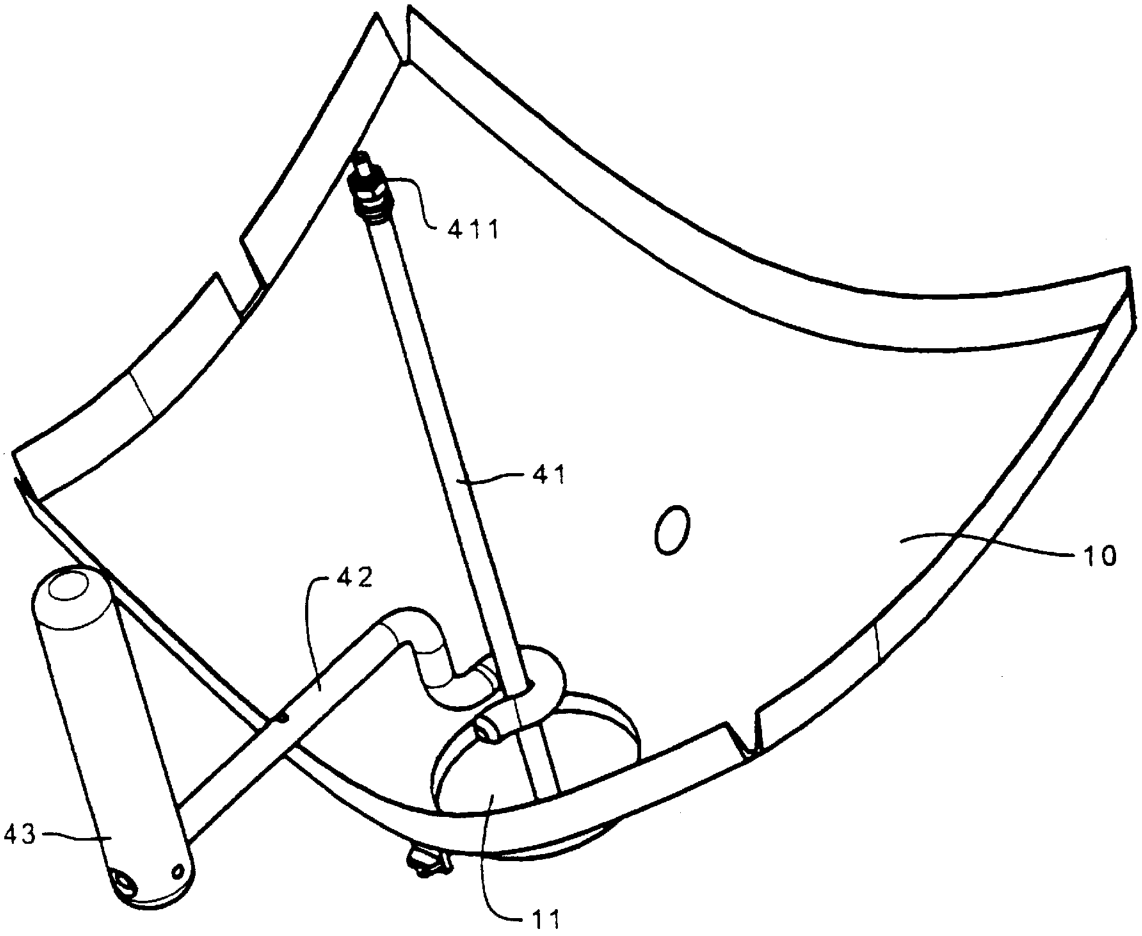
FIG. 3 is a perspective view of an unclogging system for the device of FIGS. 1 and 2.

FIGS. 1, 2, and 3 show a system for unclogging coins in the storage hopper 10. As mentioned above, the purpose of this system is to break up the domes which form when coins pile up and that hinder the outflow thereof.

The unclogging system comprises a pendulum arm 41 which is a steel rod passing through the entire pile of coins in the hopper 10 and which is hinged at one end 411. A drive rod 42 having a handle 43 mounted thereon enables the emptying agent standing beside the device to jiggle the pendulum 42 to cause it to swing through the middle of the dome of coins, thereby freeing the coins to be discharged from the bottom of the hopper 10.

Figure 4:
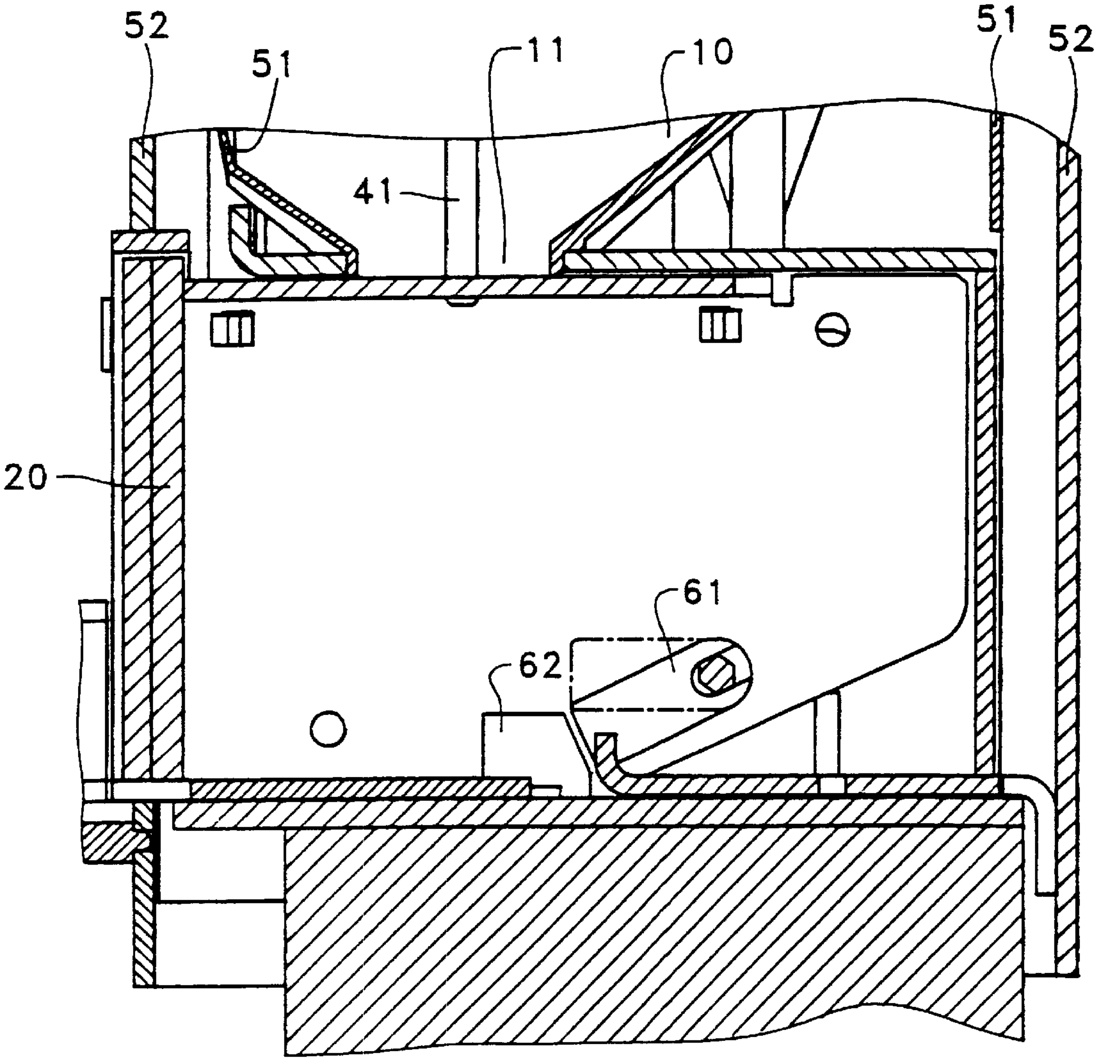
FIG. 4 is a side view of a locking system for the drawer shown in FIGS. 1 and 2.

FIGS. 1, 2, and 4 show that the emptying device is placed in double-walled armoring comprising an internal wall 51 that is not very effective against vandalism, and an external wall 52 of steel that provides protection. The gap that exists between the two walls 51 and 52 has a thickness of about 10 mm and can be filled by placing additional plates of armoring therein, as a function of the kinds of vandalistic attack that occur on site.

It will be observed that in this structure the outlet opening 11 from the hopper 10 and the pile of coins are to be found in the center of the machine, and consequently far away from its outside walls, thereby making any attempt at fraudulent access very difficult.

For the same reasons, it can be seen more particularly in FIG. 4 that the drawer 20 is provided with a locking system that is placed in the center of the drawer-walled armoring, and which is thus almost inaccessible. This locking system comprises a latch 61 and a locking abutment 62. The latch 61 can be moved from a locked position (continuous lines) to an unlocked position (chain-dotted lines), with said latch being moved by means of a key (not shown) passing through the transfer cannister 30. This key can be the same key as discussed above which serves to secure flap 31 to drawer 20.

Although a preferred embodiment of the present invention has been described in detail above, various modifications thereto will be readily apparent to anyone with ordinary skill in the art. All such modifications are intended to fall within the scope of the present invention as defined by the following claims.

I claim:

1. A coin-emptying device for a column-shaped slot machine, wherein said device comprises a hopper (10) for storing coins and having an outlet opening (11), and coin-discharge means (20) movable between a "closed" first position in which said coin-discharge means (20) closes the outlet opening (11) of the hopper (10), and an "open" second position in which said outlet opening (11) of the hopper is cleared so as to enable coins to be transferred from the machine to the outside, wherein said coin-discharge means is a drawer (20) placed beneath said hopper (10) and including a sloping duct (21) having an inlet orifice (211) and an outlet orifice (212), such that in the open position of said drawer (20) said inlet orifice (211) is in communication with the outlet opening (11) of the hopper (10), with said outlet orifice (212) enabling coins to be transferred from the machine to the outside.

2. A device according to claim 1, further comprising a "transfer-cannister" receptacle (30) into which the coins are emptied, said transfer cannister (30) having a moving opening flap (31) adapted to put the transfer cannister into communication with said coin-discharge means (20) in said open position.

3. A device according to claim 2, wherein, when the drawer (20) is in the closed position, the opening flap (31) of the transfer cannister (30) is fixed to said drawer, and wherein opening said flap (31) brings the moving drawer (20) into said open position while simultaneously putting the transfer cannister (30) into communication with the outlet orifice (212) of the sloping duct (21).

4. A device according to claim 2, further comprising a double-walled armoring (51, 52).

5. A device according to claim 4, further comprising a locking system (61, 62) for locking the moving coin-discharge means (20), said locking system being placed in the center of said double-walled armoring (51, 52).

6. A device according to claim 1, wherein the hopper (10) accommodates therein a coin unclogging system.

7. A device according to claim 6, wherein said unclogging system comprises a pendulum (41) passing through the hopper (10) and hinged at one end (411), and a drive rod (42) for driving said pendulum (40) about said end (411).

* * * * *